United States Patent [19]

Miller

[11] 4,203,303

[45] May 20, 1980

[54] TORQUE-BALANCED VIBRATIONLESS ROTARY COUPLING

[75] Inventor: Donald M. Miller, Sunnyside, Wash.

[73] Assignee: The United States of America as represented by the United States Department of Energy, Washington, D.C.

[21] Appl. No.: 929,134

[22] Filed: Jul. 28, 1978

[51] Int. Cl.² ............................................ F16D 3/50
[52] U.S. Cl. ......................................... 64/12; 64/19
[58] Field of Search ................... 64/12, 19; 74/68

[56] References Cited

U.S. PATENT DOCUMENTS

| | | | |
|---|---|---|---|
| 1,112,219 | 9/1914 | Kennedy | 64/19 |
| 2,181,888 | 12/1939 | Gustin | 64/12 |
| 3,242,693 | 3/1966 | Paulsen | 64/19 |
| 3,279,278 | 10/1966 | Eldred | 64/12 |
| 3,791,170 | 2/1974 | Schmidt | 64/12 |

FOREIGN PATENT DOCUMENTS

| | | | |
|---|---|---|---|
| 43209 | 7/1910 | Austria | 64/12 |
| 2609880 | 9/1977 | Fed. Rep. of Germany | 64/12 |
| 99145 | 6/1940 | Sweden | 64/12 |

*Primary Examiner*—Ira S. Lazarus
*Attorney, Agent, or Firm*—R. V. Lupo; Arthur A. Churm; Frank H. Jackson

[57] ABSTRACT

This disclosure describes a torque-balanced vibrationless rotary coupling for transmitting rotary motion without unwanted vibration into the spindle of a machine tool. A drive member drives a driven member using flexible connecting loops which are connected tangentially and at diametrically opposite connecting points through a free floating ring.

3 Claims, 3 Drawing Figures

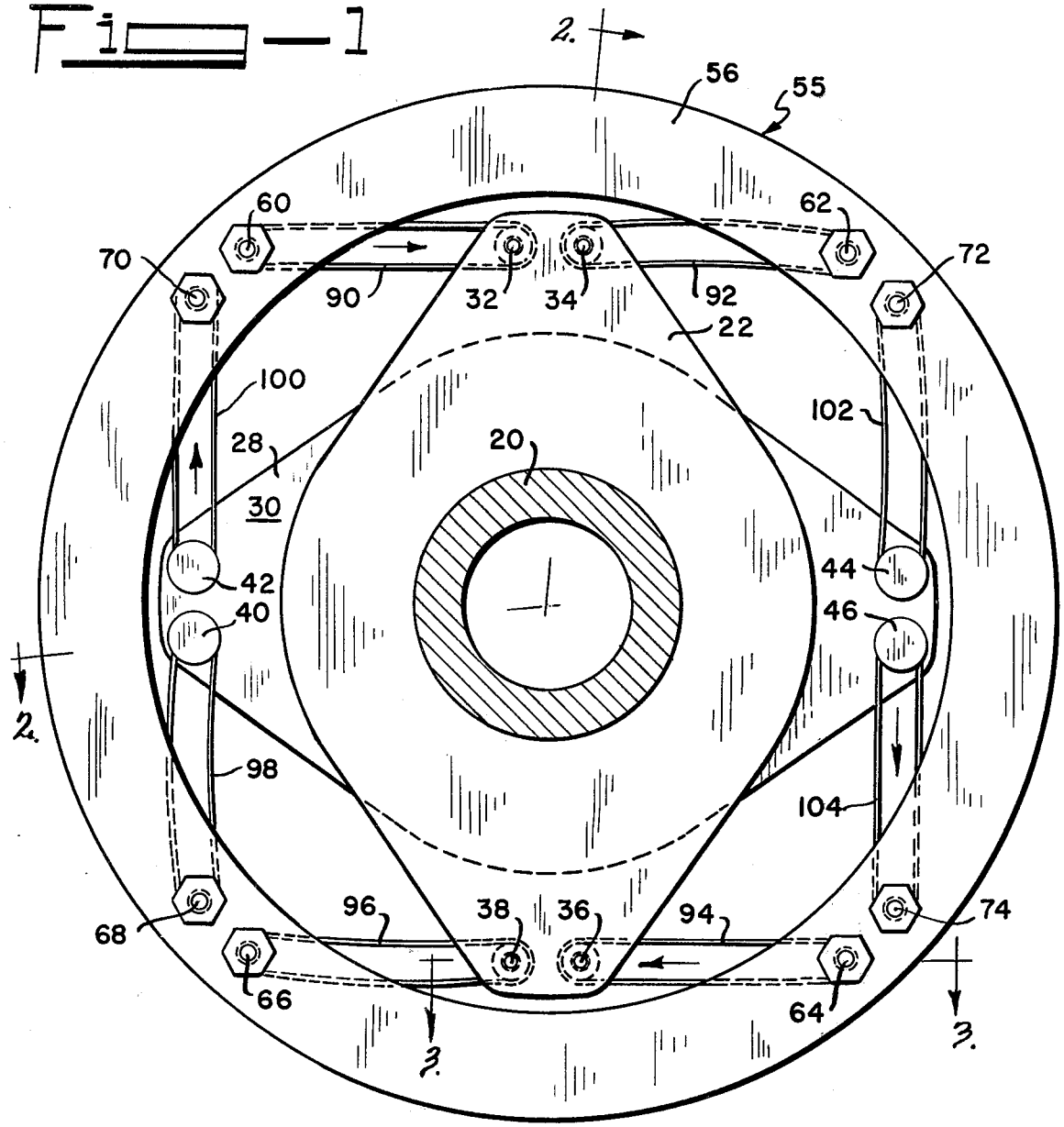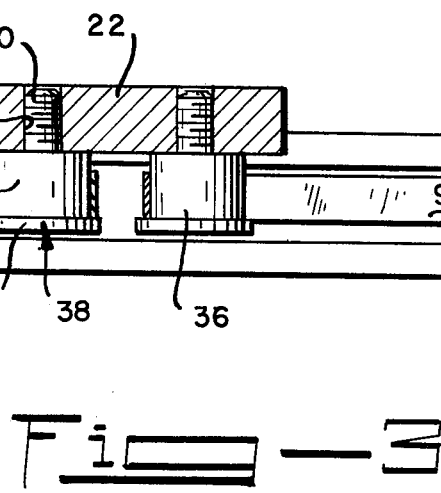

TORQUE-BALANCED VIBRATIONLESS ROTARY COUPLING

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a torque-balanced vibrationless rotary coupling for transmitting rotary motion without unwanted vibration into the spindle of a machine tool. More particularly, a drive member drives a driven member using flexible connecting loops which are connected tangentially and at diametrically opposite connecting points through a free floating ring. The coupling was designed for use with a micro-machinery system disclosed in Omega-X Micro-Machine Systems, U.S. application Ser. No. 860,053, by Donald M. Miller, filed Dec. 14, 1976. See page 16, line 28, through page 17, line 12, of this application for an explanation of how the rotary coupling (element number 178) is connected to the Omega-X micro-machining system.

Fine machining systems require special coupling techniques to connect a drive motor to a workpiece spindle so that only rotational motion is transmitted. For example, diamond turning machine spindles are presently being driven by long flat belts from remotely mounted motors. However, these flat belts are a source of vibration in that they are not of uniform weight or thickness throughout their length. Also, motor vibration can be transmitted to the spindle by the tension of the belt. Other vibrationless rotary couplings are disclosed in Mechanisms, Linkages, and Mechanical Controls by Nicholas P. Chironis (McGraw-Hill, New York, 1965) at pages 334 to 335. However, none of these designs provides the degree of isolation ncessary for the super accurate micro-machining system disclosed in the above cited patent application.

SUMMARY OF THE INVENTION

In accordance with the invention, a torque-balanced vibrationless rotary coupling is disclosed for transmitting rotary motion. A drive member drives a driven member using flexible connecting loops which are connected tangentially and at diametrically opposite connecting points through a free floating ring.

The drive member applies force to the driven member equally at diametrically opposite connecting points thereby balancing the torque force and eliminating any cranking motion in the driven member. The connecting loops are connected tangentially to both the drive and driven members through a free floating ring which is an interconnecting element between the drive and driven members. Since the ring is free floating, the applied torque is balanced. Also since the connecting loops are connected tangentially, only rotational motion is transmitted.

It is, therefore, an object of the present invention to provide a torque-balanced rotary coupling.

It is a further object of this invention to provide a vibrationless rotary coupling.

Finally, it is an object of this invention to provide a rotary coupling which transmits only rotational motion.

BRIEF DESCRIPTION OF THE DRAWINGS

Other objects and advantages of the invention will become apparent upon reading the following detailed description and reference to the drawings in which:

FIG. 1 is a sectional view of a rotary coupling with part of the connecting belts shown in phantom.

FIG. 3 is a sectional view of a portion of the rotary coupling taken in the direction of the arrows 3—3 in FIG. 1.

Figure 2:
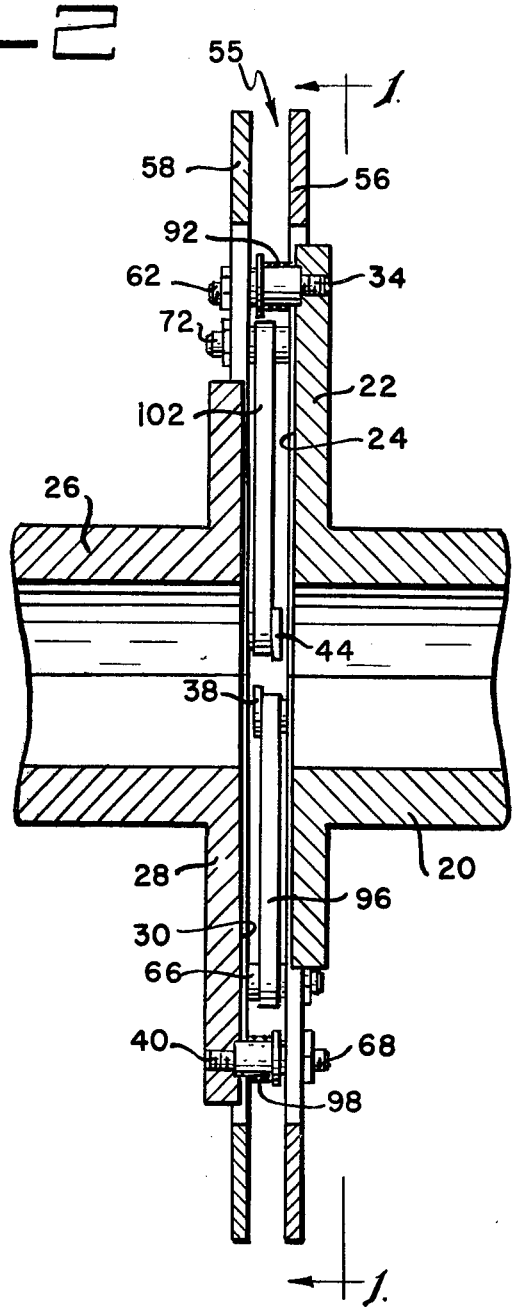
FIG. 2 is a sectional view of the rotary coupling taken in the direction of the arrows 2—2 in FIG. 1 in which one half of the figure is 90° out of line with the other half of the figure.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Referring to the figures, input hub 20 is supported for rotation about a fixed axis by a shaft (not shown). Integrally attached about the end of input hub 20 is flange 22. Flange 22 is conveniently in the shape of a parallelepiped with the corners rounded off and has a face 24 which is perpendicular to the axis of input hub 20. Coaxial to input hub 20 is output hub 26 which is also supported for rotation about a fixed axis by a shaft (not shown). Integrally attached about the end of output hub 26 is flange 28. Flange 28 is identical in shape to flange 22 and has a face 30 which is parallel to and faces face 24. It is noted that the rotary coupling is shown for operation with the axis of input hub 20 and output hub 26 parallel to the ground, although it may be operated in other positions.

Screwed into the periphery of flange 22 perpendicular to face 24 are input pins 32, 34, 36 and 38. The input pins are spaced in an elongated rectangular configuration centered at the axis of input hub 20 (see FIG. 1 where the pin configuration can be seen in phantom).

Similarly, screwed into the periphery of flange 28 perpendicular to face 30 are output pins 40, 42, 44, and 46. The output pins are also spaced in an elongated rectangular configuration centered at the axis of output hub 26 (see FIG. 1).

Since the structure and mounting of all the input and output pins are identical, the structure of only one pin, input pin 38, will be explained with particular reference to FIG. 3. Input pin 38 contains right circular cylindrical pin body 48. Coaxial to and at one end of pin body 48 is threaded post 50 which is screwed into threaded hole 52 in flange 22. At the other end, the edge of pin body 48 is surrounded by lip 54 which defines a grooved path upon which a connecting belt rides.

Disposed intermediate input hub 20 and output hub 26 is ring 55 which has an inside diameter which is larger than the longest dimension of face 24 of flange 22 or face 30 of flange 28. Ring 55 comprises parallel annular members 56 and 58. Bolted between and evenly separating annular members 56 and 58 are annular member pins 60, 62, 64, 66, 68, 70, 72, and 74. Annular member pins 60, 62, 64, and 66 are spaced in a rectangular configuration centered at the axis of annular members 56 and 58. Similarly, annular member pins 68, 70, 72, and 74 are spaced in a rectangular configuration centered at the axis of annular members 56 and 58. These rectangles have perpendicular major axes with annular member pins 60 and 70, 62 and 72, 64 and 74, and 66 and 68 being close together. The location of the annular member pins with respect to the input and output pins will be explained later.

Since the structure and mounting of all the annular member pins are identical, the structure of only one pin, annular member pin 64, will be explained with particular reference to FIG. 3. Annular member pin 64 contains right circular cylindrical pin body 76. Coaxial to and at either ends of pin body 76 are right circular threaded posts 78 and 80 which are seated in holes 82 and 84 in annular members 56 and 58. Nuts 86 and 88 engage posts 78 and 80 thereby rigidly securing pin body 76 between annular members 56 and 58.

The input, output and annular member pins are connected by belts 90, 92, 94, 96, 98, 100, 102 and 104 all of which are of equal length and which each wrap around a pair of pins as follows. As can best be seen in FIG. 2, annular member pins 60, 62, 64, and 66 are respectively connected to input pins 32, 34, 36, and 38 by belts 90, 92, 94 and 96. Annular member pins 68, 70, 72, and 74 are respectively connected to output pins 40, 42, 44 and 46 by belts 98, 100, 102 and 104.

The description herein is based on an ideal arrangement of parts which may never be observed in practice since the belts are designed to have a slight amount of slack in them. In this ideal position when the axes of input hub 20, output hub 26 and ring 55 are coaxial and all belts have an equal amount of slack, then the major axes of flanges 22 and 28 are perpendicular, the input pins and the output pins each lie on the corners of equally sized rectangles which have perpendicular major axes, all of the input, output and annular member pins lie on the edge of a square centered at the axis of input hub 20, and an elongated rectangle with pins 62, 66, 68 and 72 at its corners is equal in size to and has a major axis which is perpendicular to the major axis of an elongated rectangle with pins 60, 64, 70 and 74 at its corners. It is noted that since the coupling is designed for operation with the axis of input hub 20 and output hub 26 to be parallel to the ground in this embodiment of the invention, at rest, when the coupling is not rotated the slack in the belt causes ring 55 to hang down with its axis slightly below the axis of input hub 20 and output hub 26.

The rotary coupling is operated as follows. As seen in FIGS. 2 and 3, when input hub 20 is rotated in a clockwise direction, belts 90 and 94 become taut and cause ring 55 to rotate about its axis in a clockwise direction coaxial with input hub 20. Due to the location of the input pins at the corners of an elongated rectangle, belts 90 and 94 pull at diametrically opposite sides of ring 55, each tangent to a circle having the axis of input hub 20 as its center. As ring 55 rotates about its axis, belts 100 and 104 become taut and cause output hub 26 to rotate about its axis in a clockwise direction. Similarly, due to the location of the output pins at the corners of an elongated rectangle, belts 100 and 104 pull at diametrically opposite sides of output hub 26, each tangent to a circle having the axis of output hub 26 as its center. Belts 92, 96, 98 and 102 remain loosely on their pins, transmitting no force.

When input hub 20 is rotated in a counterclockwise direction, belts 92 and 96 become taut and cause ring 55 to rotate about its axis in a counterclockwise direction coaxial with input hub 20. For reasons discussed above, belts 92 and 96 pull at diametrically opposite sides of ring 55, each tangent to a circle having the axis of input hub 20 as its center. As ring 55 rotates about its axis, belts 98 and 102 become taut and cause output hub 26 to rotate about its axis in a counterclockwise direction. Belts 98 and 102 similarly pull at diametrically opposite sides of output hub 26, each tangent to a circle having the axis of output hub 26 as its center. Belts 90, 94, 100 and 104 remain loosely on their pins, transmitting no force.

As has been stated, pull by input hub 20 of the belts and by the belts of output hub 26 is tangent to a circle having the axis of the hubs as its center. This follows because of the relative location of the pins and the slight amount of slack in the belts. Thus rotation of input hub 20 in a clockwise direction a slight amount takes up the slack in belts 90 and 94, and when ring 56 begins to turn, belts 90 and 94 are tangent to a circle having the axis of input hub 20 as its center due to the fact that the input pins are at the corner of an elongated rectangle. As ring 56 turns, slack in belts 100 and 104 is taken up and these belts begin pulling output pins 42 and 46 tangent to a circle having the axis of output hub 26 as its center. Thus the fact that inlet hub 20 leads output hub 26 slightly coupled with the relative location of the pins results in tangential pull which transmits only rotary motion.

There are several things which should be noted about how the belts and pins are connected. The belts are connected so that only rotational forces are transmitted. The reason for this is that, as discussed above, all belts are applied tangentially to both the input and output elements. Further, the applied torques are balanced, that is the input element applies force to the driven element equally at diametrically opposite connecting points, thus eliminating the transmittal of any cranking motion. The reason for this is not only the fact that forces are applied equally at diametrically opposite points but also that the force is transmitted through a free floating ring which balances the applied torque.

The belts are made of a high tensile-strength polyethylene terephthalates film known as Mylar 0.005 inches thick by ¼ inch wide which is very strong and lightweight. Any material having characteristics similar to Mylar can be used. In the above example, flat belts are used, but circular belts (loops) can also be utilized.

It is noted that the connecting belts wrap around right circular cylindrical shaped pins. The belts are thus free to slip, permitting the forces to equalize on all sides, thus utilizing their full double strength. Any known method of attaching connecting elements other than loops would have to contain clamps or other attaching devices, causing point stressing and early failure of lightweight material. And it is essential that the very best lightweight material be used in the connecting loops.

Although for each direction of rotation more than two loops can be used to transmit motion from input hub 20 to ring 55 and more than two loops to transmit motion from ring 55 to output hub 26, for optimum results only two belts are used. The reason for this is that two belts are less apt to transmit unwanted rotation and are also more forgiving of any misalignment. It is noted that one belt would not be appropriate because the coupling would not eliminate the transmittal of cranking motion or allow the applied torque to be evenly applied to ring 55.

Although only four belts transmit force at one time, eight belts are used for the following reasons. It allows rotation in both the clockwise and counterclockwise directions. Further, it helps to prevent breakage should input hub 20 suddenly stop. Finally, it helps keep ring 55 from falling away from input hub 20 and output hub 26 when motion is stopped.

Adequate slack should be available in the belts so that the coupling can operate with a considerable amount of misalignment with no detrimental effect.

It should finally be noted that input hub 20 and output hub 26 each has a hollow center. Although not shown in the figures, an input shaft can be provided which can be securely keyed for joint rotation within the hollow center of input hub 20 and an output shaft can be provided which can be keyed for joint rotation within the hollow center of output hub 26.

Thus, it is apparent that there has been provided in accordance with the invention, a coupling that fully satisfies the objects, aims, and advantages set forth above. While the invention has been described in conjunction with the specific embodiments thereof, it is evident that many alterations, modifications, and variations will be apparent to those skilled in the art in light of the foregoing description. Accordingly, it is intended to embrace all such alternatives, modifications, and variations as fall within the spirit and broad scope of the appended claims.

The embodiments of the invention in which an exclusive property or privilege is claimed are defined as follows:

1. A coupling for transmitting rotary motion from one shaft to another comprising,
   two spaced, axially aligned, shaft-engaging hubs, each provided with diametrically opposed flanges, said flanges being at right angles,
   a pair of spaced, parallel rings having an inner diameter greater than the outer diameter of the flanged hubs disposed surrounding the hubs,
   a plurality of right, circular cylindrical pins joining said rings one to the other,
   right, circular cylindrical pins having a lip at the edge thereof extending inwardly from the flanges on each of said hubs toward the other hub,
   strong, flexible lightweight belts of equal length connecting the pins on the flanges with the pins joining the rings, said belts being essentially all in a single plane,
   said pins and belts being constructed and arranged to be slack when not under tension and, when under tension, to provide equal, tangential pull on opposite sides of the coupling.

2. Coupling according to claim 1 wherein
   the pins extending inwardly from the flanges on the hubs include two closely spaced pins on each flange, all of said pins being equidistant from the axis of rotation of the coupling,
   the pins joining the rings are arranged in four groups of two closely spaced pins each, all of said last-named pins being equidistant from the axis of rotation of the coupling, said groups of pins being disposed between the flanges on the hubs and equidistant therefrom, all of the pins thus being arranged in pairs of diametrically opposed pins, and
   the two pins on a single flange and two pins connecting the rings being in essentially a straight line.

3. Coupling of claim 2 wherein the belts are made of a high tensile strength polyethylene terephthalates film.

* * * * *